Patented Dec. 21, 1943

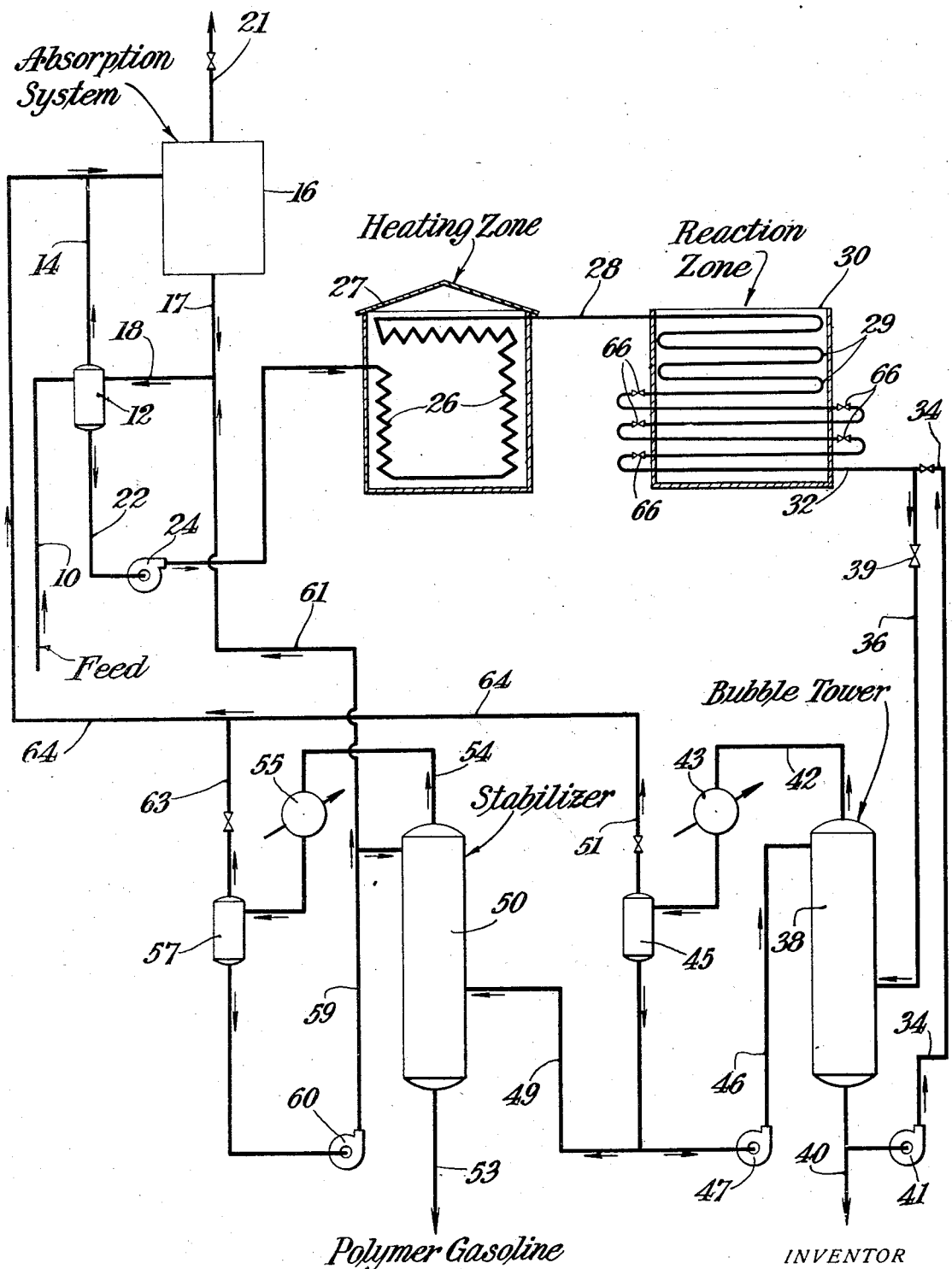

2,337,360

UNITED STATES PATENT OFFICE 2,337,360

POLYMERIZATION OF HYDROCARBONS

Walter Ullrich, Beaumont, Tex., assignor to The Lummus Company, New York, N. Y., a corporation of Delaware Application November 15, 1941, Serial No. 419,248

8 Claims. (Cl. 260—683.1)

This invention relates to the polymerization of olefin hydrocarbons to gasoline-like hydrocarbons. More particularly, this invention relates to an improved method of controlling the polymerization reaction so that the maximum yield of desired gasoline polymers is obtained and the formation of undesirable polymers is kept at a minimum.

In undergoing polymerization, an olefin-containing normally gaseous hydrocarbon mixture is heated to the desired reaction temperature in a heating zone and is then discharged into a reaction or soaking zone, in which it remains for a time sufficient to effect a substantial conversion of the gaseous olefins to the desired polymers. The reaction zone is normally unheated, for the exothermic heat of reaction of the olefin polymerization is relied upon to maintain the temperature in the reaction zone at the desired high level. This reaction zone is customarily well insulated to prevent a drop in the temperature therein by the loss of heat therefrom. Upon discharge from the reaction zone, the olefinic gases and vapors are admixed with a normally liquid, relatively high-boiling quench oil, which serves to cool the gases and vapors to arrest the polymerization thereof.

For optimum performance, it is essential that the temperature in the reaction zone be maintained within a certain range and at a relatively constant level throughout. A rise in temperature results in overpolymerization of the olefin gases whereas a drop in temperature prevents a sufficient amount of the olefin gases from polymerizing. In commercial practice, it has also been the experience that there is a tendency towards coke formation near the discharge end of the reaction zone when the temperature of polymerization is not properly controlled.

Although there is always some heat loss from the reaction or soaking zone under ordinary operating conditions, this loss is usually balanced by the exothermic heat of the polymerization reaction. When there is a rise in temperature in this zone, however, the rate of heat loss is less than the rate of heat formation. Such a condition arises when the olefin content of the gas feed is high and results in overpolymerization of the olefins with the consequent formation of undesirable polymers and tendency to form coke.

The primary object of my invention is to carry out the polymerization of olefin gases to gasoline hydrocarbons so that the temperature of the materials during the polymerization reaction is maintained at a relatively constant level.

Another object of my invention is to control the conversion conditions so as to prevent a rise in temperature during the polymerization reaction and to avoid the formation of coke when the gas feed contains a relatively high percentage of olefins.

A still further object of my invention is to carry out the thermal polymerization of olefin gases so that an increased yield of gasoline polymers is obtained.

Further objects and advantages of my invention will appear from the following description thereof taken in connection with the attached drawing, which illustrates a preferred manner of carrying out my invention.

Generally, my improved process contemplates a control of the temperature range and level during the polymerization reaction by a reduction in the pressure under which the olefin gases and polymers are maintained during their passage through the reaction or soaking zone. This reduction in pressure, particularly when the gas charge contains a relatively high percentage of olefins, is accomplished by an expansion, either gradual or sudden, of the gases and vapors as they undergo polymerization in the reaction zone. In this way, the pressure on the olefin gases and polymers is reduced, and the excess exothermic heat of reaction is utilized in maintaining the temperature of the gases and vapors at a relatively constant level to counteract the cooling effect resulting from the expansion of the gases and vapors. The expansion may be either gradual or instantaneous in accordance with the particular design and operating conditions selected and may begin or take place at an intermediate point of the reaction zone or throughout the entire reaction zone if desired. The degree of expansion effected is preferably such that the resulting pressure drop is greater than what would ordinarily be experienced in the flow of the gases and vapors through the reaction zone.

In accordance with the diagrammatic flow sheet shown in the drawing, a suitable hydrocarbon feed stock is introduced into the system through line 10. This feed stock comprises normally gaseous hydrocarbons and may be obtained from a cracking operation or the like. Such a feed stock is comprised primarily of hydrocarbon gases including olefins having four or less carbon atoms per molecule and may also contain some hydrogen and other gases such as sulfur-bearing gases. If the feed stock does contain sulfur-bearing gases, it is desirable to eliminate such gases in any well known manner (not shown)

before charging the feed stock to the polymerization system. The gaseous feed stock is introduced into feed tank 12 under sufficient pressure, for example, 150–400 pounds per square inch, to maintain the major portion of the $C_3$ and $C_4$ hydrocarbons in liquid condition, and a rough separation of the liquid $C_3$ and $C_4$ hydrocarbons from the remaining gaseous hydrocarbons is effected in this tank.

The separated hydrocarbon gases are removed from tank 12 through line 14 and are passed to an absorption system 16 or the like (conventionally shown). In this absorption system any uncondensed $C_3$ and $C_4$ hydrocarbons removed through line 14 are recovered by any well known absorption method. The recovered $C_3$ and $C_4$ hydrocarbons are returned to feed tank 12 as through lines 17 and 18. The remaining gaseous material comprised substantially entirely of $C_2$ and lower hydrocarbons and hydrogen is discharged from the absorption system as through line 21.

The separated olefin-containing $C_3$ and $C_4$ hydrocarbon gases, preferably in liquid condition, are passed from tank 12 through line 22 at a pressure above 500 pounds per square inch as by pump 24 to heating coil 26 in heater 27. In this heater the gases are raised to a reaction temperature of above 750° F. by any well known heating means. The heated gases are then passed through line 28 to reaction coil 29 positioned in the reaction zone 30. In this reaction or soaking zone the heated olefinic gases undergo polymerization to form normally liquid hydrocarbons suitable for use as a motor fuel. Reaction zone 30 is preferably well insulated in any suitable manner to prevent a drop in temperature therein.

A mixture of olefinic polymers and gases is discharged from reaction coil 29 at 32 and is cooled to a temperature below 600° F. by means of a quench oil introduced through line 34. The cooled reaction products admixed with the quench oil are discharged through line 36 into bubble tower 38, wherein a separation of the heavy liquid from the remaining vaporous conversion products is effected. Valve 39 may be conveniently provided to reduce the pressure on the quenched polymer mixture before introduction thereof into tower 38. The separated heavy liquid products comprising those polymers heavier than gasoline are removed through line 40 and may be passed to a suitable cracking unit or the like (not shown) for further conversion or may be otherwise disposed of as desired. A portion of these heavy liquid polymers is preferably recirculated through line 34 as by pump 41 to serve as the quench oil.

The overhead from the bubble tower comprising gasoline polymer vapors and normally gaseous hydrocarbons is removed through line 42 and condensed in condenser 43. The resulting condensate stream is discharged into accumulator 45, from which a portion of the condensate is returned through line 46 as by pump 47 as reflux for bubble tower 38. The remainder of the condensate is passed through line 49 to stabilizer 50. Accumulator 45 is provided with a vent line 51, through which any uncondensed normally gaseous hydrocarbons are returned to absorption system 16. The pressure in accumulator 45 is preferably maintained sufficiently high so that only the lightest normally gaseous constituents remain uncondensed.

The gasoline polymer condensate introduced into stabilizer 50 through line 49 from accumulator 45 usually contains an excess of normally gaseous hydrocarbons. Accordingly, it is subjected to a stabilization treatment in stabilizer 50 for separation of the excess normally gaseous hydrocarbons therefrom. Stabilized polymer gasoline containing the desired amount of low-boiling constituents is removed through line 53. The separated normally gaseous hydrocarbons are removed overhead through line 54 and are condensed in condenser 55. The resulting condensate is discharged into accumulator 57, from which a portion of the condensate is returned as reflux to stabilizer 50 through line 59 as by pump 60. The remainder of the condensate, which comprises primarily $C_3$ and $C_4$ hydrocarbons, is returned to feed tank 12 as through lines 61 and 18. Accumulator 57 is also provided with a vent line 63 so that the remaining lighter uncondensed normally gaseous hydrocarbons, primarily those constituents having two or less carbon atoms per molecule, can be returned to absorption system 16 for recovery of any polymerizable constituents therein. Manifold line 64 may be conveniently connected to vent lines 51 and 63 for this purpose.

In the polymerization of olefin or olefin-containing gases, control of the temperature of the gases during passage through the reaction or soaking coil 29 is important in order to insure efficient operation and optimum yields. The soaking zone or section 30 is customarily well insulated to prevent substantial loss of heat by radiation or otherwise, and the exothermic heat of reaction of the gases undergoing polymerization is relied upon to supply the heat necessary to maintain the requisite temperature of reaction and to make up for the loss of heat by radiation and thereby to maintain an equilibrium heat condition. Frequently, however, the composition of the gaseous feed is such that the desired heat equilibrium cannot be attained, and overpolymerization and/or coke formation results.

When a high olefinic gas is being polymerized, the rate of exothermic heat formation due to the reaction usually far exceeds the rate of heat loss by radiation from the soaking section. In such a case the reaction temperature increases beyond a point at which the optimum yield of gasoline polymers can be obtained. The resulting overpolymerization produces a high boiling undesirable compounds which must be otherwise treated for reconversion to more desirable products.

According to my invention, I provide an improved procedure for controlling the temperature and thereby the extent of the polymerization reaction taking place in the soaking coil 29 when the charge to the system comprises a relatively high olefinic gas. By "high olefinic gas" I refer to a gaseous feed stock which is relatively rich in olefinic gases and contains 25% or more of olefins. My improved procedure calls for control of the pressure under which the olefin gases are maintained whereby control of the reaction temperature and thereby control of the extent of the reaction can be readily and simply accomplished. This object is effected by expansion of the gaseous stream either gradually or suddenly at one or more points in its passage through the soaking coil so that the resulting pressure drop is greater than that which would ordinarily be experienced. In this manner the temperature of reaction is prevented from rising so high that a loss in yield of desirable gasoline polymers would result.

When such a high olefinic gas is polymerized according to my improved procedure, it is heated to the desired reaction temperature in heating zone 27 and is then introduced into reaction or soaking coil 29, wherein the desired conversion to gasoline polymers takes place. In order to control the extent of the conversion so that the optimum yield of gasoline polymers is obtained, I make provision for expanding the stream of olefinic gases and polymer vapors in its passage through soaking coil 29. Such expansion may be carried out in any desired manner; for example, it may be effected either gradually or suddenly in a plurality of stages as the gases and vapors flow through the coil.

With most feed stocks, however, it will be found satisfactory to maintain the flowing stream of gases and vapors under a substantially constant pressure during passage thereof through at least the initial portion of the reaction coil except, of course, for the incidental pressure drop. In such case the gases and vapors may be suddenly expanded at an intermediate point in the reaction coil 29, or they may be expanded in a plurality of stages after passing an intermediate point in such coil, or they may alternatively be gradually expanded after passing such an intermediate point; in each case, however, the resulting pressure drop will be greater than the ordinary, incidental pressure drop.

For this purpose I provide a plurality of slide valves 66 or the like, which serve to throttle the gaseous stream as it passes through coil 29 and to thereby lower the pressure on such stream. In this manner advantage is taken of the cooling effect resulting from the expansion of the gases and vapors to balance the increased rate of exothermic heat formation due to the polymerization of the high olefinic gas and to maintain the desired heat equilibrium condition. The temperature of the gases and vapors is thus maintained within a narrow range, and overpolymerization of the olefinic gases with the accompanying formation of undesirable heavy polymers and/or coke is readily avoided.

The degree of expansion effected and the location of the point or points of expansion depend, of course, primarily on the composition of the gaseous feed stock charged to coil 29 and on the desired extent of conversion. When a plurality of throttling or expansion valves is used, they may be conveniently positioned at spaced points such as at the ends of the individual tubes of coil 29 as shown in the drawing. If a gradual expansion is desired, it may be preferable to provide tubes of increasing diameter as the discharge end of coil 29 is approached.

It will be appreciated that a soaking drum or its equivalent may be substituted for soaking coil 29. In such case the soaking drum can be so constructed that its diameter increases gradually or stage-wise from its feed end to its discharge end and so that the resulting pressure drop is greater than what would ordinarily take place.

Typical operating conditions for polymerizing gaseous olefins into higher boiling liquid hydrocarbons according to my invention are a temperature above 750° F., particularly a temperature between 750° F. and 1250° F., and a pressure ranging from 500 to 3,000 pounds per square inch. A relatively high olefinic gas may be successfully thermally polymerized, for example, at a temperature of 1020 to 1100° F. and under a pressure of 500 to 1600 pounds per square inch. The length of time that the gases and vapors require for passage through heating zone 27 and reaction zone 30, respectively, may vary from 5 to 200 seconds or more according to the composition thereof. The pressure drop that these gases and vapors suffer in undergoing expansion may range from 50 to 500 pounds per square inch or more. It will be appreciated, however, that the above figures are only representative of the operating conditions that may be employed.

The actual conditions selected are determined in accordance with the composition of the gaseous feed stock and the characteristics of the ultimate liquid product desired. The resulting relationship between temperature, pressure, time, and composition is such that the optimum yield of a high quality product is obtained. This relationship should also be such, of course, that no coke formation occurs in the reaction zone.

It will be seen that I have accomplished the objects of my invention inasmuch as I have provided a polymerization system in which the temperature at which the polymerization of a high olefinic gas is effected is readily controlled by means of a simple control of the pressure at which the olefinic gases and vapors are maintained in their passage through the reaction zone.

Although I have shown and described a preferred manner of carrying out my invention, I am aware that modifications may be made thereto; therefore, only such limitations as appear in the claims appended hereinafter should be applied.

I claim:

1. The method of maintaining the reaction temperature in the polymerization of normally gaseous olefin hydrocarbons to gasoline hydrocarbons at a relatively constant level, which comprises passing an olefin-containing gas through a heating zone and raising it therein to the temperature of reaction, passing the heated gas to a substantially unheated reaction zone and maintaining it therein for a time sufficient to effect a substantial polymerization of the gaseous olefins to gasoline, maintaining the resulting mixture of gases and polymer vapors under a substantial pressure during passage thereof through said reaction zone, and reducing the pressure on said mixture of gases and polymer vapors during passage thereof through said reaction zone whereby the excess exothermic heat of reaction substantially balances the cooling effect resulting from the reduction in pressure, the resulting pressure drop being greater than that which would ordinarily be experienced.

2. The method of controlling the reaction temperature in the polymerization to gasoline hydrocarbons of normally gaseous olefin hydrocarbons contained in a gas charge having a high olefin content, which comprises passing the gas charge through a heating zone and raising it therein to the temperature of reaction, passing the heated gas to a substantially unheated reaction zone and maintaining it therein for a time sufficient to effect a substantial polymerization of the gaseous olefins to gasoline, maintaining the resulting mixture of gases and polymer vapors under a substantial pressure during passage thereof through said reaction zone, and maintaining the temperature in said reaction zone at a relatively constant level by expanding said mixture of gases and polymer vapors during passage thereof through said reaction zone whereby the excess exothermic heat of reaction substantially balances the cooling effect resulting from the expansion, the resulting pressure drop being greater than that which would ordinarily be experienced.

3. The method of controlling the reaction temperature in the polymerization to gasoline hydrocarbons of normally gaseous olefin hydrocarbons contained in a gas charge having a high olefin content, which comprises passing the olefin-containing gas through a heating zone and raising it therein to the temperature of reaction, passing the heated gas to a substantially unheated reaction zone and maintaining it therein for a time sufficient to effect a substantial polymerization of the gaseous olefins to gasoline, maintaining the resulting mixture of gases and polymer vapors under a substantial pressure during passage thereof through at least the initial portion of the reaction zone, and maintaining the temperature in said reaction zone at a relatively constant level by reducing the pressure on said mixture of gases and polymer vapors after passage thereof beyond an intermediate point of said reaction zone whereby the excess exothermic heat of reaction substantially balances the cooling effect resulting from the reduction in pressure, the resulting pressure drop being greater than that which would ordinarily be experienced.

4. The method of controlling the reaction temperature in the polymerization to gasoline hydrocarbons of normally gaseous olefin hydrocarbons contained in a gas charge having a high olefin content, which comprises passing the gas charge through a heating zone and raising it therein to the temperature of reaction, passing the heated gas to a substantially unheated reaction zone and maintaining it therein for a time sufficient to effect a substantial polymerization of the gaseous olefins to gasoline, maintaining the resulting mixture of gases and polymer vapors under a substantial pressure during passage thereof through at least the initial portion of the reaction zone, maintaining the temperature in said reaction zone at a relatively constant level by suddenly expanding said mixture of gases and polymer vapors after passage thereof beyond an intermediate point of said reaction zone whereby the excess exothermic heat of reaction substantially balances the cooling effect resulting from the expansion, the resulting pressure drop being greater than that which would ordinarily be experienced, and maintaining said mixture of gases and vapors under the resulting reduced pressure during passage thereof through the remainder of the reaction zone.

5. The method of controlling the reaction temperature in the polymerization to gasoline hydrocarbons of normally gaseous olefin hydrocarbons contained in a gas charge having a high olefin content, which comprises passing the gas charge through a heating zone and raising it therein to the temperature of reaction, passing the heated gas to a substantially unheated reaction zone and maintaining it therein for a time sufficient to effect a substantial polymerization of the gaseous olefins to gasoline, maintaining the resulting mixture of gases and polymer vapors under a substantial pressure during passage thereof through the reaction zone, and maintaining the temperature in said reaction zone at a relatively constant level by suddenly expanding said mixture of gases and polymer vapors in a plurality of stages during passage thereof through said reaction zone whereby the excess exothermic heat of reaction substantially balances the cooling effect resulting from the expansion, the resulting pressure drop being greater than that which would ordinarily be experienced.

6. The method of controlling the reaction temperature in the polymerization to gasoline hydrocarbons of normally gaseous olefin hydrocarbons contained in a gas charge having a high olefin content, which comprises passing the gas charge through a heating zone and raising it therein to the temperature of reaction, passing the heated gas to a substantially unheated reaction zone and maintaining it therein for a time sufficient to effect a substantial polymerization of the gaseous olefins to gasoline, maintaining the resulting mixture of gases and polymer vapors under a substantial pressure during passage thereof through at least the initial portion of the reaction zone, and maintaining the temperature in said reaction zone at a relatively constant level by suddenly expanding said mixture of gases and polymer vapors in a plurality of stages after passage thereof beyond an intermediate point of said reaction zone whereby the excess exothermic heat of reaction substantially balances the cooling effect resulting from the expansion, the resulting pressure drop being greater than that which would ordinarily be experienced.

7. The method of controlling the reaction temperature in the polymerization to gasoline hydrocarbons of normally gaseous olefin hydrocarbons contained in a gas charge having a high olefin content, which comprises passing the gas charge through a heating zone and raising it therein to the temperature of reaction, passing the heated gas to a substantially unheated reaction zone and maintaining it therein for a time sufficient to effect a substantial polymerization of the gaseous olefins to gasoline, maintaining the resulting mixture of gases and polymer vapors under a substantial pressure during passage thereof through at least the initial portion of the reaction zone, and maintaining the temperature in said reaction zone at a relatively constant level by gradually expanding said mixture of gases and polymer vapors after passage thereof beyond an intermediate point of said reaction zone and before discharge thereof from said reaction zone whereby the excess exothermic heat of reaction substantially balances the cooling effect resulting from the expansion, the resulting pressure drop being greater than that which would ordinarily be experienced.

8. The method as claimed in claim 3, wherein the gas charge contains more than 25% of polymerizable olefins.

WALTER ULLRICH.